R. C. NASH.
Cotton-Planter.

No. 30,981. Patented Dec. 18, 1860.

Witnesses:
R. F. Osgood

Inventor:
Richard C Nash
By his atty
J. S. Brown

UNITED STATES PATENT OFFICE.

RICHARD C. NASH, OF SOMERVILLE, TENNESSEE.

IMPROVEMENT IN COTTON-SEED PLANTERS.

Specification forming part of Letters Patent No. 30,981, dated December 18, 1860.

*To all whom it may concern:*

Be it known that I, RICHARD C. NASH, of Somerville, in the county of Fayette and State of Tennessee, have invented a new and Improved Cotton-Seed Planter; and I do hereby declare that the following is a full and exact description thereof, reference being had to the accompanying drawings, making part of this specification—

Figure 1:
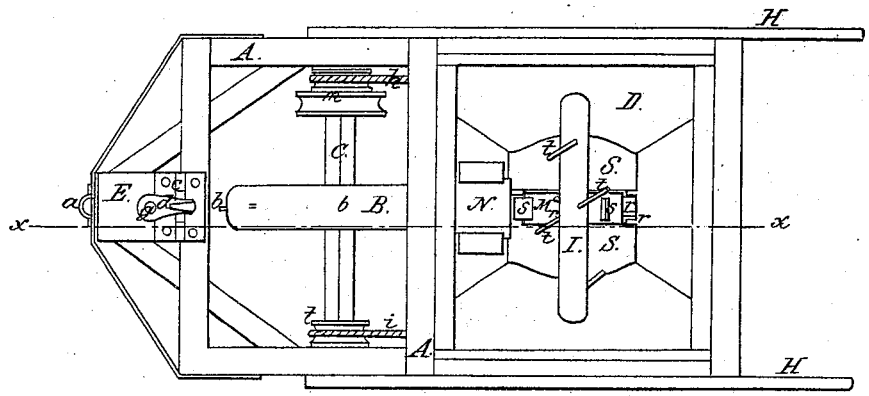
Figure 2:
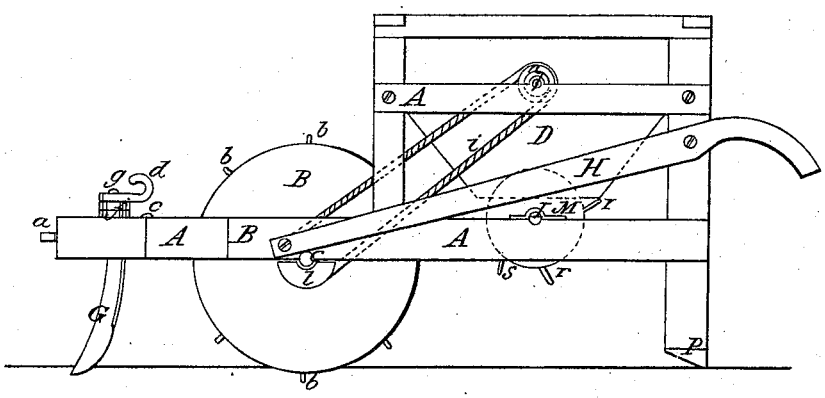
Figure 3:
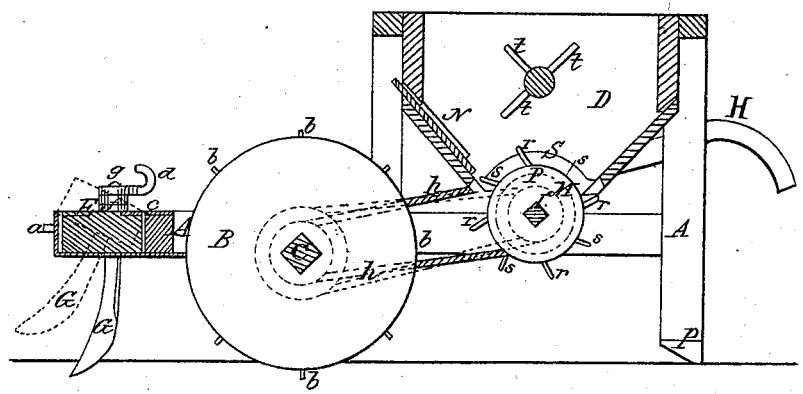

Figure 1 being a plan of the machine; Fig. 2, a side elevation thereof; Fig. 3, a vertical section of the same in the plane indicated by the line $x\ x$, Fig. 1.

Like letters designate corresponding parts in all the figures.

The frame A of the machine is made in the form represented, or in any other which may be convenient, to be drawn at $a$ by a chain or otherwise. Handles H H are attached to the sides of the frame to guide the machine with. A drill-tooth, G, for opening the furrow is secured to a block, E, by its shank $g$ and a nut, $d$. Washers $f\ f$ are put on the shank $g$, above or below the block E, to vary the depth of furrow. The block E is hinged to the frame at $c$, so that the opening-tooth may be lifted up out of the way, as indicated by red lines in Fig. 3, when meeting obstructions. In order that the attendant may have control of this opening-tooth from behind the machine, a cord may be attached to the block E and extend backward, so as to be reached by him. The forward end of the machine is supported by a wheel, B, which runs in the furrow opened by the drill-tooth G, and serves also to deepen and smooth the furrow, as well as to drive the seed-dropping mechanism. For this latter purpose pins or projections $b\ b$ may be attached to its periphery to prevent its slipping on the ground.

The seed is dropped and distributed from the hopper or seed-box D by a revolving seeding-wheel, M, the upper portion of which turns in said seed-box between two concentric curved cheeks, S S, in the bottom thereof. The revolving motion is communicated to this seeding-wheel by a band, $h$, extending from a pulley, $m$, on the driving-wheel shaft C to a pulley, $p$, on the shaft L of said seeding-wheel. The relative velocity of this revolution is varied by having grooves of different sizes in the pulleys $m\ p$. From the periphery of the seeding-wheel project alternate radial pins or spikes, $r\ r$, and blades $s\ s$, substantially as shown in the drawings, the pins or spikes being intended to stir and bring down the cotton-seed uniformly, and the blades more particularly, to carry down the seeds and discharge them. The amount of seed sown is regulated by a sliding gate, N, on the inside of the front of the hopper D. In order further to stir the seed in the hopper D and move it alternately from side to side over and across the path of the seeding-wheel, I locate a transverse shaft, I, in the upper part of the hopper, as shown, and give it a revolving motion by a band, $i$, extending from a pulley, $l$, on the driving-wheel shaft C to a pulley or groove, $n$, on said shaft I. From this shaft I cause pins $t\ t\ t$ to project obliquely in alternate positions, substantially as represented. The effect of this arrangement is that above described as its purpose.

The rear end of the machine is supported by a drag or scraper, P, which covers the cotton-seeds and leaves the ground in the desired shape and condition.

What I claim as my invention, and desire to secure by Letters Patent, is—

The combination and arrangement of the hinged drill-tooth G and driving-wheel B of the seeding-wheel M, with alternate pins $r\ r$ and blades $s\ s$, and shaft I, with alternate oblique pins $t\ t\ t$, substantially as and for the purposes herein specified.

In witness that the above is a true specification of my improved cotton-seed planter I hereunto set my hand this 12th day of May, 1860.

R. C. NASH.

Witnesses:
L. P. JONES,
T. J. ROACH.